Nov. 13, 1962  R. W. PATEE  3,063,401
SNOW VEHICLE

Filed Sept. 1, 1959  5 Sheets-Sheet 1

INVENTOR.
ROBERT W. PATEE
BY
AGENT

Nov. 13, 1962 R. W. PATEE 3,063,401
SNOW VEHICLE
Filed Sept. 1, 1959 5 Sheets-Sheet 2
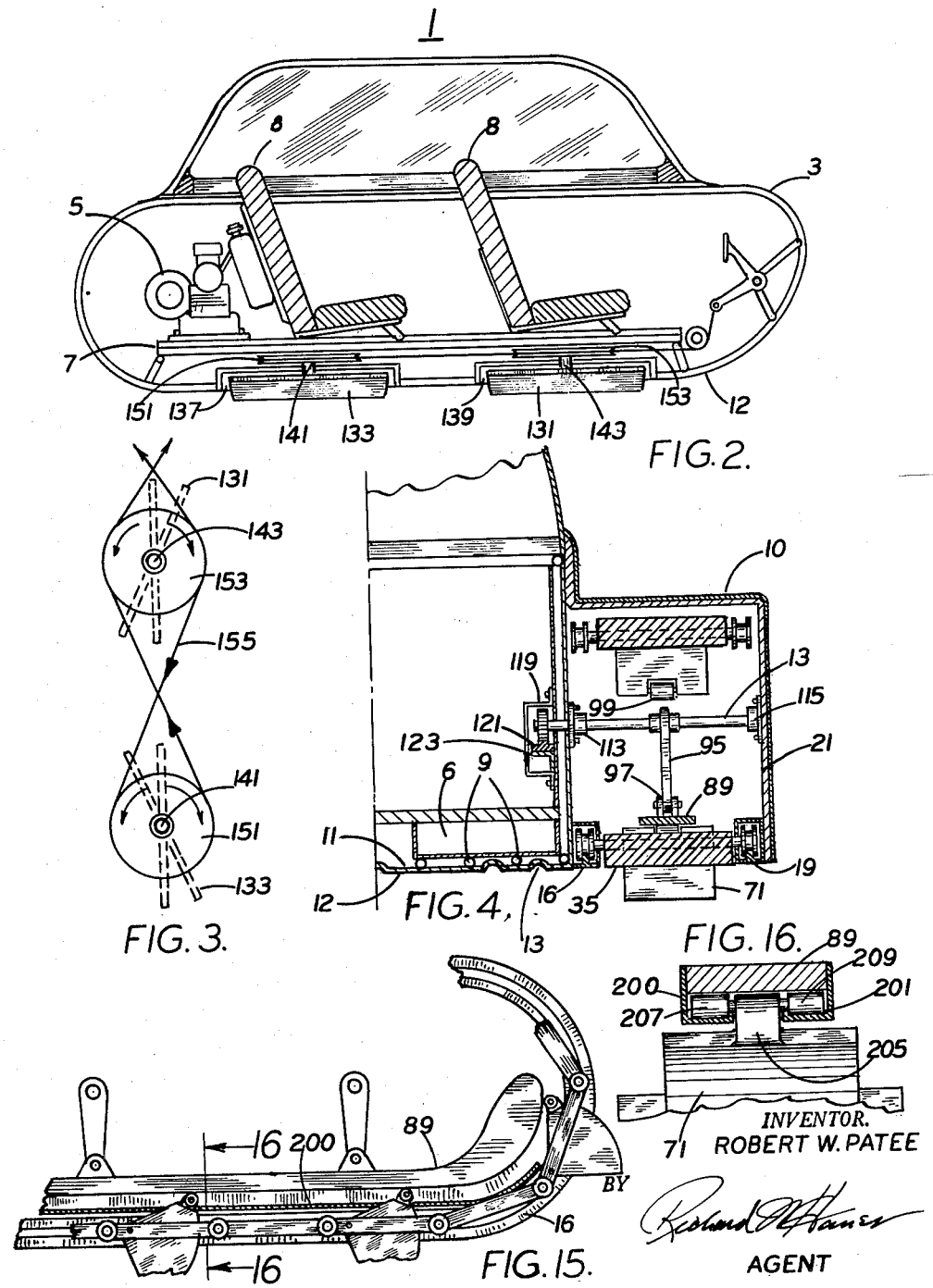
INVENTOR.
ROBERT W. PATEE
BY
AGENT Nov. 13, 1962  R. W. PATEE  3,063,401
SNOW VEHICLE
Filed Sept. 1, 1959  5 Sheets-Sheet 3

INVENTOR.
ROBERT W. PATEE
BY
AGENT

Nov. 13, 1962 R. W. PATEE 3,063,401
SNOW VEHICLE
Filed Sept. 1, 1959 5 Sheets-Sheet 4

INVENTOR.
ROBERT W. PATEE
BY
AGENT

Nov. 13, 1962 R. W. PATEE 3,063,401
SNOW VEHICLE
Filed Sept. 1, 1959 5 Sheets-Sheet 5

INVENTOR.
ROBERT W. PATEE
BY
AGENT 3,063,401
SNOW VEHICLE
Robert W. Patee, 17 El Sereno Drive,
Colorado Springs, Colo.
Filed Sept. 1, 1959, Ser. No. 837,417
16 Claims. (Cl. 115—1)

This invention relates to a man carrying motor vehicle and more particularly to a vehicle for travel over snow, water, or boggy terrain.

Heretofore vehicles designed for use over snow were not well suited for travel over water or boggy terrain because of their non-buoyant type of body construction and the limited use of the snow propelling means. The design considerations which provided traction in the snow had inherent disadvantages for driving the vehicle in water. Propelling means for the typical snow vehicle have usually taken the form of a protrusion extending from its movable mounting into the snow or ice and there providing a gripping or holding function for a particular part of the track, wheel, or movable runner to which the protrusion was attached. The gripping protrusions have several disadvantages in their conventional form which this invention avoids. For example, the conventional protrusion extending away from its mounting is always of a fixed dimension and angular extension, that is there is no opportunity for the operator of the vehicle to control the amount of "bite" the propelling means takes in the snow surface. The fixed extensions also preclude entirely the possibility of using downhill terrain to an advantage because the extensions will not allow the vehicle to slide or "sled" over the surface of the snow. The very nature of the construction of the propelling means adds great weight and bulk to the vehicle and adds nothing of a buoyant character to the vehicle. One of the chief disadvantages of the traditional propelling means is its great tendency to become clogged and jammed between adjacent protrusions with snow or ice thus rendering the propelling means less efficient and less able to "hold" the snow and ice.

The present invention avoids these and other disadvantages in addition to making possible a vehicle of lighter weight and simpler construction. Thus a primary object of the present invention is to provide a load carrying self propelled toboggan which may be used on snow or in water or boggy terrain without special additions to the vehicle to make it buoyant.

A further object of the invention is to provide a novel conveyor type of drive track for track laying vehicles which is self cleaning as it operates and contributes to the buoyancy of the vehicle to which it is attached.

A further object of this invention is to provide a track laying vehicle which can be steered without slowing or braking one track and thus maintaining full driving power on both tracks at the same time.

A further object of the invention is to provide a conveyor type of drive track for a track laying vehicle which can be mounted on the vehicle and operate thereon without the use of the customary boggy wheels and idler wheels found in the track laying vehicles of the prior art.

A further object of the invention is to provide an efficient propelling device for a snow vehicle which will allow the vehicle to which it is attached to be convertible at the simple control of the operator from a self propelled snow vehicle to a downhill sliding toboggan with a smooth surfaced bottom.

A further object of the invention is to provide an efficient propelling device for a snow vehicle which will perform efficiently in water as a propelling means.

A still further object of the invention is to provide a drive track and its associated propelling devices which will function as a variable braking and steering means during the sledding operation of the vehicle.

Other and still further objects and advantages of the invention will become apparent from the detailed description of the invention in one of its configurations taken in conjunction with the accompanying drawings in which:

FIG. 2 represents a cross section of the entire vehicle in a second or modified type of body design. The sledding rudders are also shown as typical of their construction in any body design.

FIG. 3 is a functional representation of the steering system for sledding control when a forward and aft rudder are both supplied.

FIG. 4 is a vertical cross section of the track and part of the vehicle body taken at section lines 4—4 in FIG. 5.

FIG. 15 is a modified form of extensible cleat and camming bar which provides positive locking engagement between those members when they are in contact with each other.

FIG. 16 is a vertical cross section of part of the modified form of extensible driving cleat of the locking channel member which is attached to the underside of the camming bar.

Figure 1:
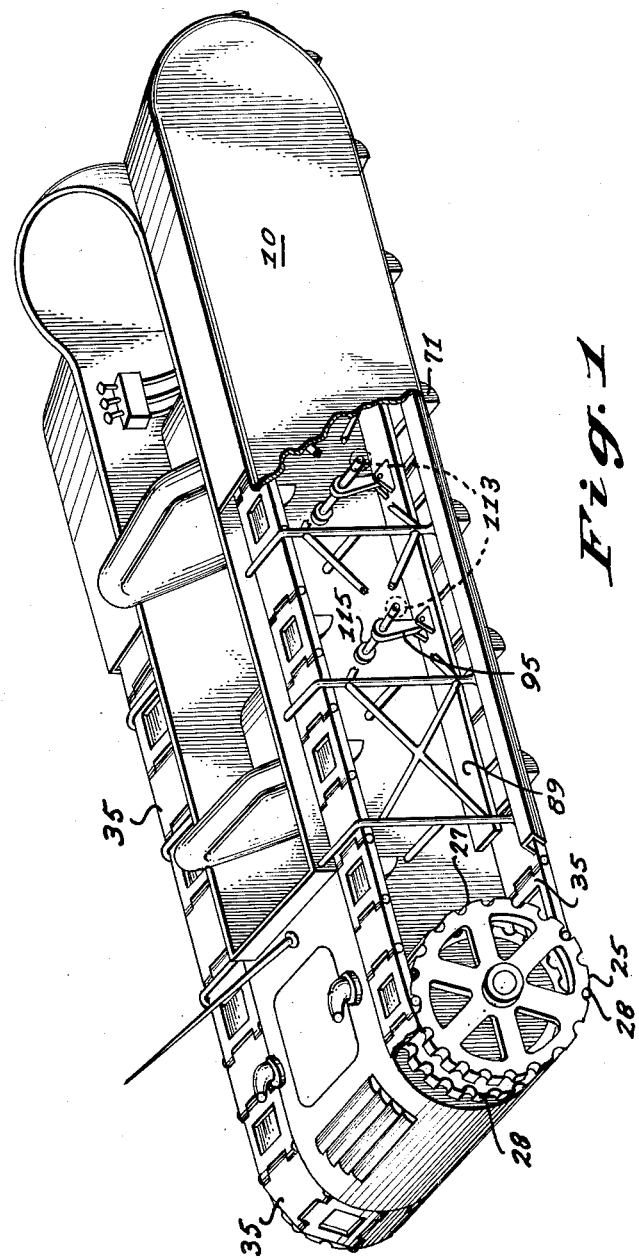
FIG. 1 is an overall view of the entire vehicle in one design embodiment with an open cockpit and in which part of the side is removed to expose the drive wheels and track.

In brief the invention contemplates a load carrying toboggan of lightweight construction which is capable of sledding on downhill terrain and being guided by one or more rudders, controllable by the toboggan operator, and mounted in or on the vehicle so as to engage the snow and provide turning moments.

For those many occasions when the vehicle requires power in order to propel itself, a gasoline or other convenient type of motor is installed inside the toboggan with all of the conventional and well known controls for operating and controlling a motor. The drive shaft of the motor is coupled to one or more drive wheels which engage and rotate the driving track. In the embodiment of the invention to be explained in detail hereinafter one driving track is employed on each side of the vehicle in the style which is conventional to the present day Caterpillar tractors, war tanks, etc. In this embodiment of the vehicle the engine is coupled to the driving wheels on each side of the vehicle through appropriate clutches and couplings, which form no part of this invention, and which operate in the conventional manner to provide steering for the vehicle by differential braking of the separate tracks when the tracks are rotating and providing the vehicle with moving power.

The tracks of this powered toboggan vehicle obtain their traction or "gripping" power through a number of protruding blade elements mounted on rigid metal plates which, when linked together in an endless loop, form the driving track. The protruding blade elements which dig into the snow or boggy terrain over which the toboggan is being driven are of such construction and are mounted on the track plates in such a way as to permit the blade elements to be extended to a more protruding position or retracted completely to a position where no protrusion exists at all and the track surface is smooth. It will be apparent that in this latter mode of operation the propelling track has acquired the characteristic of the smooth bottom surface of the toboggan itself, thus permitting complete sledding freedom.

The apparatus controlling the retraction and extension of the blade elements, which are hereinafter referred to as the extensible cleats, is so constructed and arranged that the extensible cleats are extended, even in the power or driving mode of operation, for only that period of time in which the cleats are at the "bottom" of the track loop, that is in engagement with the terrain. During the remainder of the time in one revolution of the track the extensible cleats are fully retracted by some form of spring means. The retraction of each extensible cleat once during every revolution of the track functions to scrape the cleat clean and eliminate the packed snow existing between adjacent cleats.

When operating in the free sledding mode the extensible cleats may be variably extended on one or both sides of the vehicle to provide differential braking for abrupt changes in heading not available from the rudder guidance system or for equal track braking for slowing the toboggan or bringing it to a complete stop.

For a more detailed explanation of the one embodiment of the invention reference is made to the drawings wherein the vehicle 1 is illustrated in FIG. 1 as having one particular design configuration and is illustrated in FIG. 2 with a modified body form. Whichever form of body design is employed the operation and construction of the vehicle is similar in the respects to be described in this specification. The toboggan vehicle has a body portion 3 which houses a driving engine 5 supported on the floor 7 of the vehicle which is raised from the level of the bottom surface of the vehicle to permit installation therebetween of air tight containers 6 providing buoyancy to the vehicle while in water. Secured to the floor 7 are two seats 8, the forward one of which is the operator's position.

The body is of light weight tubular metal construction 9 covered with aluminum sheeting 10 on all parts of the body except the toboggan like bottom surface where a harder metal such as steel 11 is used for a covering. The basic principles of construction well known in the aircraft frame art are utilized in building this vehicle. Basic to the body design and construction is the smooth surfaced toboggan hull 12 with longitudinal stabilizing grooves 13 which permits free sledding over the surface of the snow when traversing downhill terrain. The body is not supported by its driving tracks 31 as is the conventional track laying vehicle, but is supported like a toboggan, that is on its own smooth bottom surface.

Figure 7:
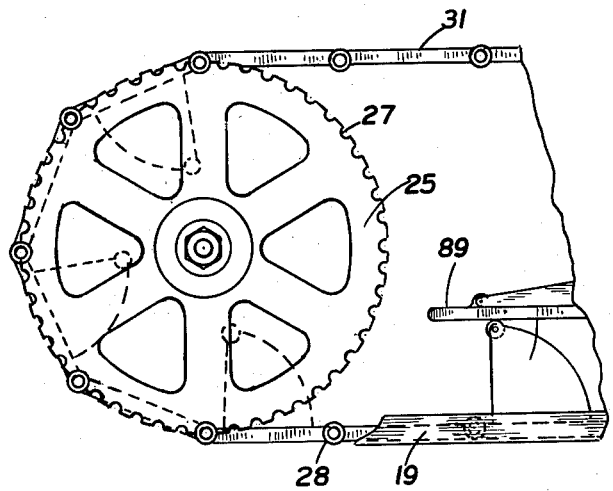
FIG. 7 illustrates the rear portion of the driving track where it engages the rear pair of driving wheels.
Figure 8:
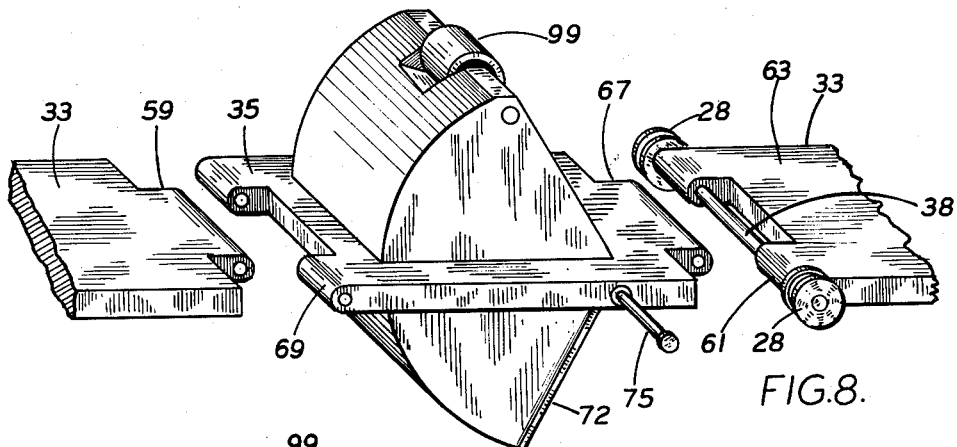
FIG. 8 is a semi-exploded view of the track plates showing the mounting plate for the extensible cleat.
Figure 9:
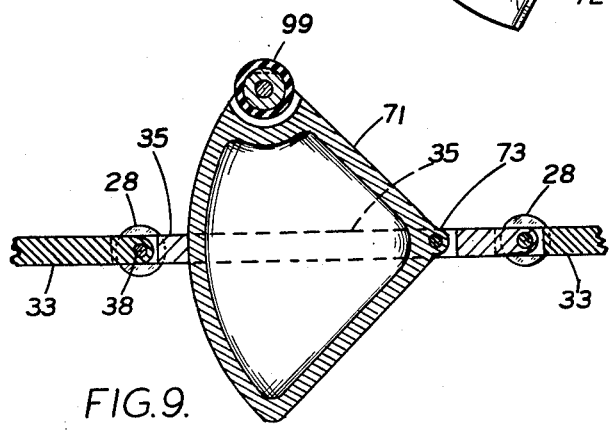
FIG. 9 is a vertical cross section of the extensible driving cleat and its mounting plate.
Figure 10:
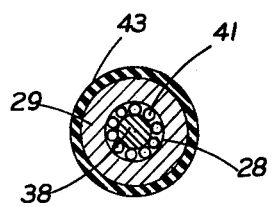
FIG. 10 is a vertical cross section taken through one of the flanges of the roller which carries the track plates in the supporting channel members.
Figure 13:
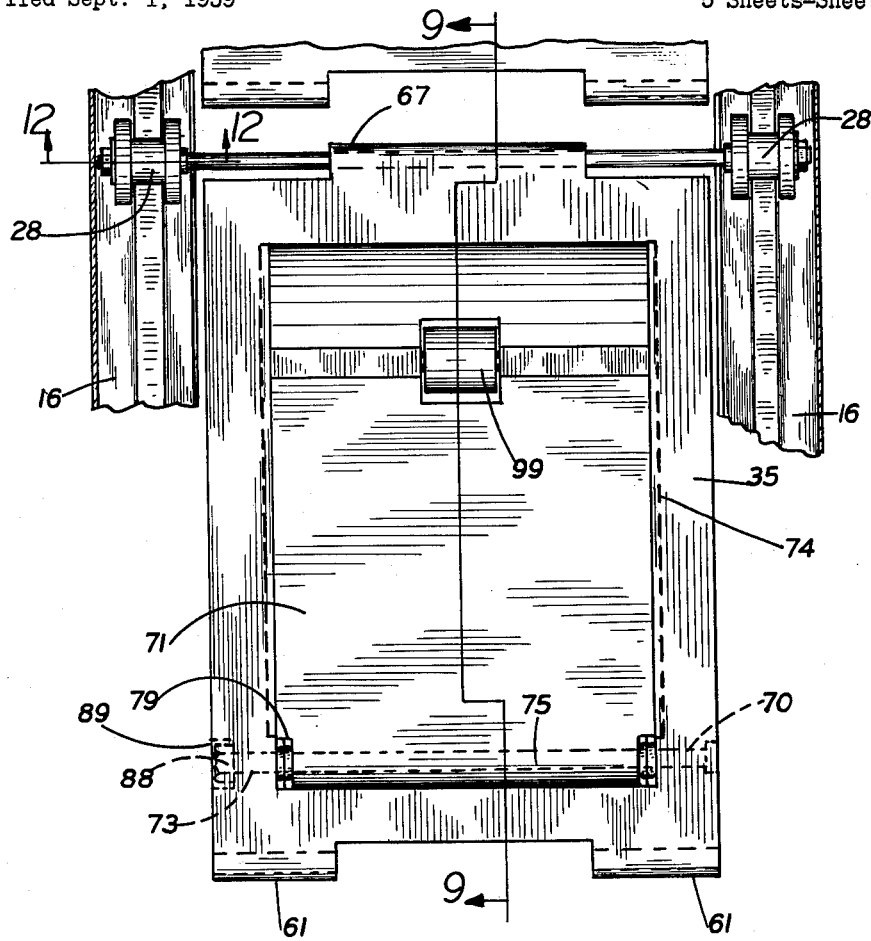
FIG. 13 is a plan view of the extensible cleat and its mounting plate as seen from inside the track loop.

Welded to the longitudinal frame member which constitutes the outside bottom edge of the body is the channel member 16 which extends the length of the body and follows the curving body contour around the front end of the vehicle. Although shown in FIG. 4 as existing on the right side of the body it is to be understood that a similar channel member 16 exists on the opposite side of the vehicle. Outwardly from the body on both of its sides and attached to it by a network of tubular structural members 21 is a second or outside channel member 19 mounted in such a position that its flat bottom surface is in the same plane as that defined by the toboggan hull 12 and the bottom surface of the inside channel member 16. The inside and outside channel members 16 and 19 on each side of the body form two pairs of runners outboard of the vehicle, which among other things, give the vehicle increased vertical stability. Outside channel members 19, like the corresponding inside channel members 16, extend the length of the body from a point immediately forward of the dual track-driving wheels 25 and 26, as seen in FIG. 7, to the forward end of the vehicle and follow the upturning contour of the front end of the vehicle as shown more clearly in FIG. 5. In addition to their subsidiary purpose of stabilization the primary and fundamental function of the pairs of channel members 16 and 19 is to serve as supporting guide tracks for the rollers 28 which carry the propelling track, generally indicated at 31 in FIG. 5. The propelling track 31 consists of hinged-together plates, a plurality of which, when attached to each other by hinging pins 38 form an endless loop. In FIG. 8 it can be seen that the track plates are of two different types, one a plain flat metal plate 33 with hinges on both of its ends, and the other a mounting plate 35 for an extensible cleat which will be more fully explained later.

Figure 12:
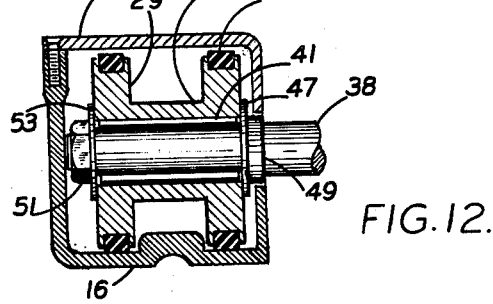
FIG. 12 shows a vertical cross section of the track-carrying roller and the channel member in which the roller rides. The section is taken at section lines 12—12 in FIG 13.

Referring now to FIG. 12 where the track-carrying roller 28 is illustrated in cross section, it is seen that the roller is of the sealed bearing type requiring no lubrication for the life of the roller, the bearings 41 being in direct contact with the reduced diameter end of the hinging pin 38. The roller 28 is properly positioned on the hinging pin by appropriate washers 47 and 49 and secured thereon by well known techniques, the simplest of which is by a nut 51 threaded onto a further reduced diameter end of the hinging pin 38. The further reduction of the diameter provides a shoulder against which the nut and its associated washer 53 may abut without binding the roller 28. The flanges 29 of the roller 28 are each provided with a ring of rubber 43 around their outside circumference to absorb shock and reduce the noise inherent in metal to metal contact.

FIG. 12 also illustrates the construction of the channel members. To avoid the possibility of the channel member becoming filled with snow and thus impeding the running of the roller 28 in the channel, a covering plate 55 is attached to the outside portion of the channel member. The inside portion of the covering plate 55 is bent down to complete the coverage of the roller housing, the only opening in the complete supporting channel being a longitudinal slot on the inside of the channel through which the hinging pins pass as the track 31 rotates.

Turning now to a more detailed discussion of the track and its component plates, it is seen in FIG. 8 that every other track member is a solid flat plate of cast metal construction with hinge bearings 59 and 61 on either end thereof. The flat outside surface 63 of each plate is finished smooth to permit free sliding over the surface of the snow with a minimum of friction. Connecting two of the flat plates 33 in the endless loop track 31 is a cast metal plate 35, hereinafter referred to as the mounting plate, with its center portion removed. The removed section is rectangular in shape, leaving the mounting plate 35 in the form of a rectangular frame with hinge bearings 59 and 61 respectively of the adjacent flat plates 33.

Disposed within the cut-out section of the mounting plate 35 is a pivotally mounted blade element 71 which may protrude from the plane of the mounting plate for biting engagement with the snow over which the vehicle is being driven, thus providing the gripping action necessary to all track laying vehicles. The blade element 71 is of hollow metal construction and is sealed air tight to give added buoyancy to the vehicle when it is in water. Each of the blade elements 71 is of approximate sectoral vertical cross section and rectangular in radial cross section. Located at the apex 73 of the angle formed by the two radii of the sector shape is a transverse hole in the blade element through which travels an axle pin 75 which is supported on each of its ends by corresponding holes 70 and 73 in the mounting plate 35.

Figure 5:
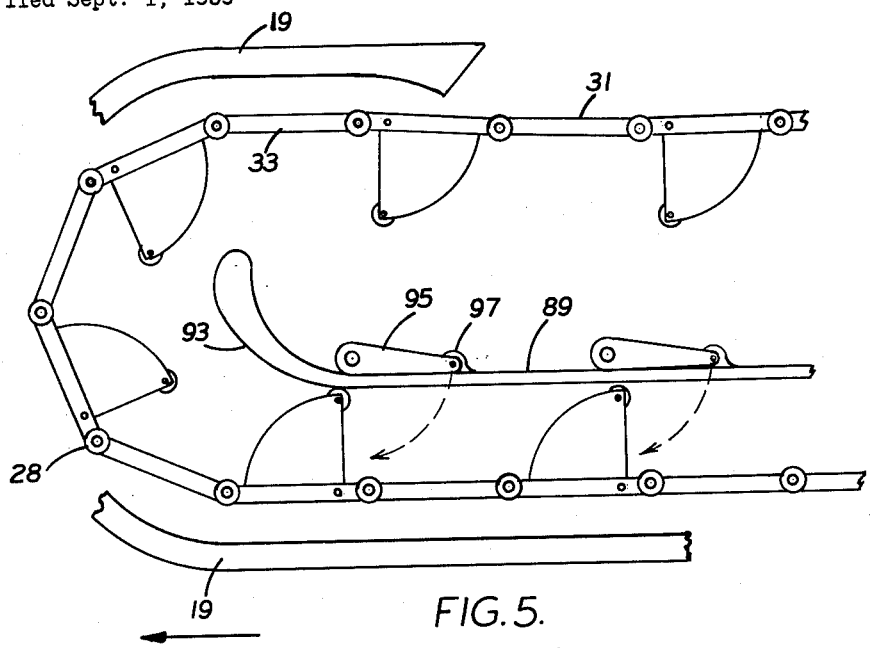
FIG. 5 shows an elevation of the front portion of the track with the camming bar and extensible cleats in their fully retracted position. The broken away channel member which carries the track is exploded away from its normal position.

Since it is the purpose of the track to present a smooth sledding surface under certain conditions and to propel the vehicle through the use of extended blade elements under other circumstances, the blade element is provided with two identical springs which constantly exert a biasing force on the blade element so as to rotate it about its pivotal center 75 at its apex 73, to bring one outer radius of the blade 71 into flush alignment with the terrain engaging surface of the mounting plate 35, as seen in FIG. 5. Other means for extending the blade element to a protruding position will be explained later. Because the blade element is rotatable about its axle pin 75 and is thereby retractable or extensible, the blade element 71 will hereafter be referred to as an "extensible" cleat.

Figure 14:
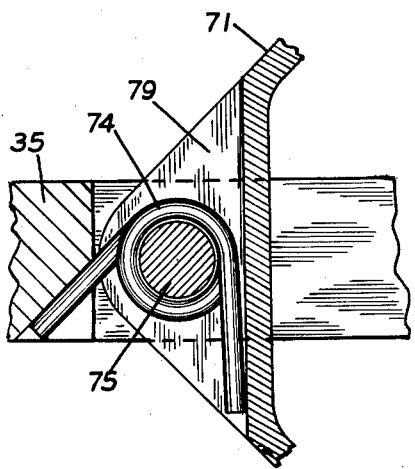
FIG. 14 is a vertical cross section of the rear or "apex" portion of the extensible driving cleat illustrating one method of biasing the cleat to a flush position with its mounting plate.

To give the necessary biasing force to the extensible cleat 71 a helical spring 74 is placed around the axle pin 75 on each side of the extensible cleat 71 in special cut-outs 79 provided to accommodate the spring so that the ends of the spring bear against the mounting plate 35 and the extensible cleat 71 so as to tend to rotate the cleat in the proper direction for its retraction. See FIG. 14. To prevent the biasing springs 74 from forcing the extensible cleats past a position of flush alignment with the mounting plate 35 each cleat has a turned up lip 72 which engages a beveled edge 74 in the mounting plate when the cleat is fully retracted into the mounting plate 35.

After the cleat 71 and its biasing springs 74 are properly mounted on the plate 35 the axle pin 75 is locked in place by threading a nut 88 on the extreme end of the pin 75 in a counterbored recess 89, concentric to the axle pin mounting hole 73 in the sides of the mounting plate 35.

With the spring means normally urging the extensible cleats 71 into flush alignment with the terrain engaging surface of the mounting plates 35, the toboggan vehicle is prepared for sledding operation over downhill terrain where gravity supplies the necessary motivating force and the sliding efficiency is increased to a maximum because of the small amount of drag produced by the smooth hull and the smooth tracks on either side thereof. During the sledding mode of operation braking becomes a problem as well as steering and it is one of the novel features of this invention that both of these problems are solved with the same means as is used for propelling the vehicle.

Figure 6:
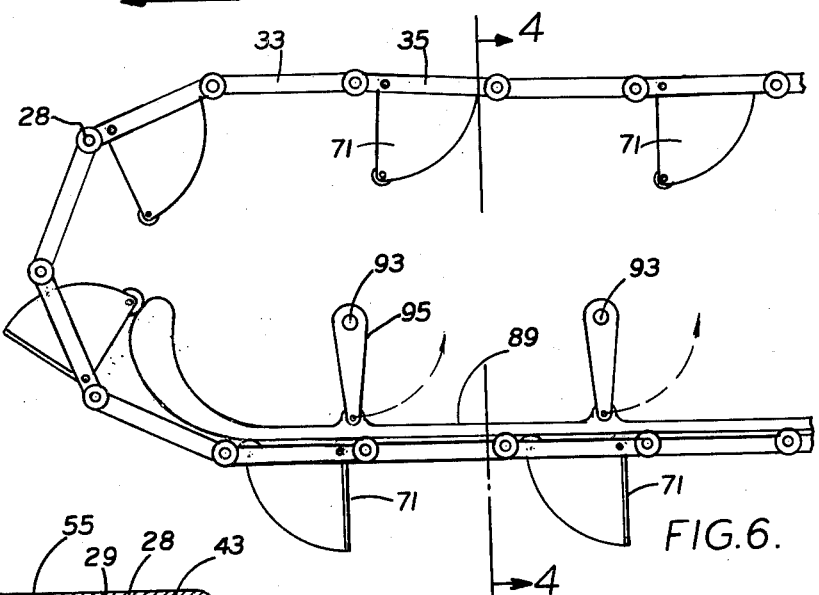
FIG. 6 is also an elevational view of the front portion of the driving track but with the camming bar and extensible cleats in their fully extended position.

As explained heretofore the extensible cleats 71 become the gripping or traction devices for the track when the cleats are extended in greater or lesser degrees from their fully retracted position. FIGS. 5 and 6 illustrate the mechanism which is responsible for extending the cleats 71 during the period of the track revolution when the cleats would be in engagement with the terrain. A long camming bar 89 with an upturned forward end is hung midway the two outer edges of the track and above the bottom side of the track loop by a plurality of pivotally mounted hanger arms 95. The ends of the hanger arms 95 are pivotally attached to mounting ears 97, located at spaced intervals on the top of the camming bar 89, and the rotation of the hanger arms 95 about their pivotal mounting 93 causes the camming bar 89 to move both up and down and from forward to the rear. As seen in FIG. 5, when the camming bar is in its uppermost position it is also in its rearmost position and the extensible cleats 71 in their travels around the perimeter of the track loop do not come into contact with the camming bar. However when the camming bar is shifted down and forward by means to be explained subsequently the extensible cleats come into contact with the upturned end of the camming bar 89 and are "cammed" or forced into an extended position by overcoming the biasing spring tension and pivoting the cleat about the axle pin 75 as the cleats progress down and to the rear following the contour of the channel members 16 and 19 which carry them. The degree of extension of the cleats 71 is dependent on the amount which the camming bar 89 is lowered. FIG. 6 shows the extreme position of the bar which forces the extensible cleats 71 into their fully extended position for maximum gripping action or maximum braking action.

To reduce the shock of the cleats and camming bar coming into contact and to permit easy extension of the cleats directly below the descending camming bar 89 without any binding between the two members, each extensible cleat 71 is equipped with a rubber roller 99 rotatably mounted on a bearing rod and disposed in a cut-out groove in the lateral center of the extensible cleat at a point where one radius of the sector shape intersects the circumference.

The mechanism for raising and lowering the camming bar 89 is well known and does not form a part of this invention per se. As best shown in FIG. 4 the hanger arms 95 are securely attached to a rotating spindle 93 which is journaled at each of its ends in appropriate bearings 113 and 115 supported by a structural member 21 of the body frame. Extending through its inside support bearing 113 the spindle 93 terminates on the inside of the vehicle body where a pinion gear 119 is mounted thereon. Engaging the pinion gear 119 is a rack 121 which extends the length of the camming bar 89 and is supported by a conventional lubricated tray member 123 attached to the frame of the vehicle body. As is well known in the mechanical art longitudinal movement of the rack results in rotation of the pinion gear 119 and spindle 93, thus causing the hanger arms 95 to raise or lower the camming bar 89.

To move the rack 121 forward or to the rear a hydraulic cylinder is provided with the piston of the cylinder connected to the rack in any convenient manner. The cylinder and its variable operator's control are not illustrated because of their conventional nature. It is to be understood, however, that a separate hydraulic cylinder and its associated control is provided for each camming bar on the two sides of the vehicle. The variable separate controls for each side of the vehicle is advantageous in steering the vehicle in either the powered mode or sledding modes of operation. While the vehicle is traveling under its own power the extension of the cleats on one side of the vehicle a greater amount than on the other side will result in greater traction on the more extended side and turning of the vehicle will result. This method of steering the vehicle results in smoother more efficient operation because the amount of driving power delivered to the driving wheels is not changed. It is noted however, that if both tracks were delivering full traction power by running with the extensible cleats fully extended the only method of steering would be the differential braking used in contemporary track laying vehicles. During the sledding of the vehicle when the cleats are normally retracted to reduce drag and the engine is not rotating the driving track, equal braking on both tracks may be obtained by extending the cleats on both tracks equally. Steering during downhill sledding traverse may be had by extending the cleats on one side while leaving the cleats on the other side fully retracted.

From the very nature of snow it is clear that a great tendency exists for the space between successive cleats to become packed and clogged with snow and ice, causing the individual cleats to lose their efficiency in gripping or holding the surface and thus in driving the vehicle forward. To prevent such a loss in effective engagement with the snow surface the extenible cleats 71 are wiped clean during every revolution of the track. Referring to the drawing of the rear portion of the track 31 in FIG.

7 it is seen that the camming bar 89 is terminated short of the dual track driving wheels 25 and 26. Thus as the track plates and cleats move to the rear of the vehicle the rubber roller 97 on the cleat 71 runs off the end of the camming bar 89 and permits the combined forward motion of the vehicle and the biasing springs 74 on the cleat to fully retract the extensible cleats into their position of flush alignment with the mounting plate 35. Because the clearance between the cut-out portion of the mounting plate 35 and the sides of the extensible cleat 71 is small, the mounting plate acts as a scraper to rid all sides of the cleat of clinging snow or other foreign material, thus cleaning the track once every revolution.

Figure 11:
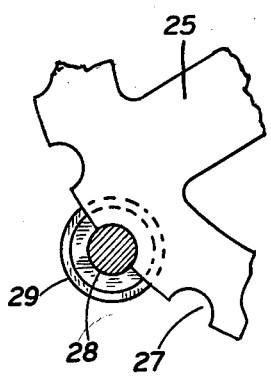
FIG. 11 is a detail of a portion of the outside circumference of one of the driving wheels showing the driving engagement with the track-carrying rollers.

Each one of the driving tracks 31 is continuously in engagement with a pair of dual driving wheels 25 and 26, one of the wheels 25 engaging the track carrying rollers 28 on the outboard side of the track, and the other of the wheels 26 engaging the track-carrying rollers 28 on the inboard side of the track. Each of the driving wheels 25 and 26 is notched around its circumference in a continuous series of circle segments comprising scallops 27 having the same radius as the rollers 28. Typical of the operation of all driving wheels is the illustration in FIG. 11 of the outboard wheel 25 and its engagement with a track-carrying roller 28. The flanges 29 on each side of the roller 28 straddle the thickness of the driving wheel with which it is engaged and prevent the roller from becoming disengaged from the wheel. The dual driving wheels 25 and 26 on each side of the vehicle are each attached to the drive shaft of motor 5 through clutches and connections which are individually controlled by the vehicle operator to obtain differential steering under the conditions of full cleat extension as explained above. The specific forms of clutches and couplings to the driving wheels are conventional and form no part of the invention here described and so are not illustrated or described in detail.

To permit guidance of the vehicle while sledding, without reducing speed by adding drag to one track or the other as explained earlier, a rudder system is provided in the hull of the vehicle comprising a forward and an aft rudder 131 and 133. Each is composed of inflexible metal plating and is disposed within a shallow enclosed well 137 and 139 in the bottom hull of the vehicle. Supporting each of the rudders are vertically positioned shafts 141 and 143 which are journaled in bearings attached to the vehicle frame at the point where the shafts protrude through the housing wells 137 and 139. Fixed rigidly to the upper end of the rotating shafts 141 and 143 are sheaves 151 and 153 respectively, around which is routed a control cable 155, the two ends of which are attached to the right and left rudder pedals in the vehicle cockpit. Pressure on one rudder pedal by the operator will result in the two rudders 131 and 133 turning in such directions as to complement each other in applying turning moment forces to the moving vehicle. A functional illustration of the cable control method is shown in FIG. 3. Smaller vehicles of the type described require only the aft rudder but larger vehicles are more effectively guided by the use of the two rudder system described, the forward rudder 131 acting to prevent sudden skidding of the front end when the rear rudder is activated suddenly.

FIGS. 15 and 16 show a modified form of cleat extending apparatus wherein the camming bar 89 has attached to its underside two L-shaped channels 200 and 201. The two channels 200 and 201 do not meet but are separated a sufficient distance to permit entry there between of a mounting bracket 205 which is substituted for the shock roller 99 on the first mentioned embodiment of the extensible cleat 71. Supported on a shaft running through the mounting bracket 205 are two rubber rollers 207 and 209 which are accommodated and supported by the channels 200 and 201 respectively. Thus as the extensible cleats 71 move downwardly along the front contour of the track carrying channel members 16 and 19 the rollers 207 and 209 enter the open end of the channels 200 and 201. Such an arrangement gives positive locking engagement between the camming bar and the extensible cleats.

Having thus described my invention what I claim as new and desire to secure by Letters Patent is:

1. A powered amphibious vehicle of the type adapted for travel over snow, boggy terrain, water, and the like comprising a body, traction means disposed on either side of said body, said traction means including a pair of horizontally spaced apart channel members rigidly attached to said body, a plurality of rollers disposed in said channel members, a plurality of flat smooth surfaced plates hinged one to another at terrain surface contacting level in an endless loop and carried by said rollers between the said pair of channel members, at least one of the said flat plates carrying an extensible grouser cleat.

2. An amphibious vehicle comprising a body supported by its own flat bottom, terrain engaging traction means mounted on said vehicle body, means mounted on said vehicle cooperating with said traction means to retract and extend the traction means whereby when the traction means are retracted the bottom surface of the vehicle is a toboggan surface, said traction means comprising an endless loop of hinged together elements which are interconnected at the surface contacting level of the bottom rim of said endless loop.

3. In a track laying vehicle a track comprising in combination a plurality of flat smooth surfaced plates hinged one to another at terrain surface contacting level in an endless loop, and roller means connected to each of said plates for attaching the track to a vehicle.

4. The combination of claim 3 wherein at least two of said flat smooth surfaced plates have their center portions removed, and further comprising a cleat, said cleat pivotally mounted on said latter type flat plates and disposed within the open center portion of the said flat plates.

5. The combination of claim 4 wherein said cleats are flat and smooth on one side thereof and further including means normally retaining the flat side of said cleat flush with the plane of the said flat plate to which the cleat is pivotally mounted.

6. In a track laying vehicle an endless track comprising a series of track plates hinged one to another, cleat means mounted on said track plates, said cleat means having a sectoral shaped cross section and being pivotally mounted to said track plates at the apex of the angle formed by the radii of the sectoral shape, said cleat means being movable from a retracted position wherein one radius of the sectoral shaped cleat means is flush with the plane of the flat plate on which said cleat is mounted to an extended position wherein the same radius forms an angle with the plane of the plate on which said cleat is mounted and protrudes from alignment with the track.

7. The combination of claim 6 further including scraping means contiguous with the extensible cleat means at the arc of the said cleat's sectoral shape whereby the said scraping means removes foreign matter from the arc face of said cleat means as it is retracted into its flush position with its mounting plate.

8. For use in a powered vehicle an endless track, one or more cleat means pivotally mounted on said track, said cleat means having at least one flat surface and one arc formed surface, the pivotal mounting of said cleat means being the center of a circle of which the arc surface is but a part, means normally urging said one flat surface of the said cleat means into alignment with the endless track, means having a camming contour and movable from one position to a position of engagement with a portion of said cleat means whereby as the cleat means progresses with the rotating track to assume a position at the bottom of said track the cleat means contacts the camming contour of the said movable means and is forced into an extended position protruding from alignment with the track.

9. In an endless track a track plate with its center portion removed, a cleat, said cleat being sectoral in cross section taken vertically through its longitudinal axis and whose cross section derived from a plane passed along a radius of the sector is similar to the shape of the inside of the rim which forms the said track plate, and said cleat pivotally mounted to said track plate at a point forming the center of a circle of which the sectoral shape is but a part, and means biasing the said cleat to a position in which one outside radius of its sectoral cross section lies in the plane defined by the terrain engaging surface of the said track plate.

10. A vehicle comprising a source of driving power, a body having a terrain engaging toboggan like hull carrying said source of driving power, dual track supporting frame members rigidly attached to said body on either side thereof, a pair of endless tracks each comprising a plurality of members hinged together at ground contacting level, means movably supporting each of said tracks in the said track frames, cleat means movably mounted on said track members, means attached to said track normally urging said cleat means into flush alignment with the surface of the track members, actuator means mounted on the said body and adapted to engage the cleat means positioned on the bottom of the track and thereby extend the cleat means into a position protruding from normal alignment with the surface of the track.

11. An amphibious vehicle of the type adapted for travel over snow, boggy terrain, water, and the like comprising in combination a load carrying self-supporting body having a substantially flat toboggan like hull, dual track supporting frames disposed on either side of said body, a pair of endless tracks, each of which is movably mounted in said track frame, said endless tracks comprising a series of flat plates hinged one to another at surface contacting level in an endless loop, cleat means movably attached to the said track plates for extension outward of the said track or retraction into flush alignment with the track, means normally maintaining the said cleat means in its retracted position, controllable camming means attached to said body and adapted to provide extension of the cleat means during a portion of the track revolution, and means integral with said track plates mounting the cleat means for removing the foreign matter clinging to the said cleats once during every revolution of the track.

12. The combination of claim 11 wherein each track frame is comprised of a pair of horizontally spaced apart channel members rigidly attached to the said body of the vehicle and extending substantially the length of the vehicle body in the plane of the body's flat bottom and following the upturning contour of the vehicle's front end to a point of being parallel with the terrain engaging portion of the channel members, and further comprising a pair of horizontally spaced apart drive wheels disposed on either side of said vehicle body at its aft end, a source of driving power carried by the body and connected to the said pairs of drive wheels, the track being carried in a semi-circular contour at its aft end by its engagement with the drive wheels.

13. The combination claim 12 wherein the movable mounting of the track in the track frames comprising a plurality of rollers mounted for free rotation on both sides of the said track plates and running in the said spaced apart channel members, and further comprising means integral with the said drive wheels for engaging the said rollers and whereby the track is driven in its continuous loop.

14. An amphibious vehicle of the type adapted for travel over snow, boggy terrain, water, and the like comprising in combination a load carrying self-supporting body having a substantially flat toboggan like hull, dual track supporting frames disposed on either side of said body, a pair of endless tracks, each of which is movably mounted in said track frame, said endless tracks comprising a series of flat plates hinged one to another in an endless loop, the terrain engaging surface of said track lying in the plane of the flat hull of the said vehicle body, cleat means movably attached to the said track plates for extension outward of the said track or retraction into flush alignment with the track means normally maintaining the said cleat means in its retracted position, controllable camming means attached to said body and adapted to provide extension of the cleat means during a portion of the track revolution, means integral with said track plates mounting the cleat means for removing the foreign matter clinging to the said cleats once during every revolution of the track, and further including at least one vertically standing rudder attached to the underside of the body hull and means controlling the angular position of the rudder whereby the vehicle may be effectively steered during such operations as may require the said cleat means to be retracted at all positions on the said track and where the smooth tracks and flat bottom of the body effectively provide a single toboggan-like sledding surface.

15. An amphibious powered vehicle of the type adapted for travel over snow, boggy terrain, water, and the like, comprising in combination a loading carrying body, prime mover means carried by said body, rotatable track means disposed on either side of said body and operatively connected to said prime mover means, said track means including a plurality of smooth sliding surface forming means interconnected at the level of the said sliding surface, and traction means, and means carried by said body and operatively engageable with said track means for extending said traction means into an operative position.

16. A powered amphibious vehicle of the type adapted for travel over snow, boggy terrain, water, and the like, comprising in combination:
a load carrying body;
power means carried by said body;
rotatably mounted endless loop forming track means disposed on either side of said body and operably connected to the power means, said track means normally having a substantially smooth terrain contacting surface;
extensible cleat means carried by said track means;
and means mounted on said body and engageable with said track means for extending said cleat means and converting the normally smooth surfaces of the track means into one having increased traction.

References Cited in the file of this patent

UNITED STATES PATENTS

| | | |
|---|---|---|
| 1,189,821 | Horan et al. | July 4, 1916 |
| 1,364,020 | Barletta | Dec. 28, 1920 |
| 1,749,276 | Edmonds | Mar. 4, 1930 |
| 2,138,207 | Roebling | Nov. 29, 1938 |
| 2,308,327 | Darragh | Jan. 12, 1943 |

FOREIGN PATENTS

| | | |
|---|---|---|
| 311,362 | Germany | Mar. 17, 1919 |
| 673,559 | Great Britain | June 11, 1952 |